United States Patent
Kim et al.

(10) Patent No.: US 9,713,134 B2
(45) Date of Patent: Jul. 18, 2017

(54) METHOD AND DEVICE FOR ALLOCATING RESOURCE FOR DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Myoungseob Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/382,511

(22) PCT Filed: Jan. 24, 2013

(86) PCT No.: PCT/KR2013/000559
§ 371 (c)(1),
(2) Date: Sep. 2, 2014

(87) PCT Pub. No.: WO2014/003278
PCT Pub. Date: Jan. 3, 2014

(65) Prior Publication Data
US 2015/0036560 A1  Feb. 5, 2015

Related U.S. Application Data

(60) Provisional application No. 61/664,137, filed on Jun. 25, 2012, provisional application No. 61/681,599, (Continued)

(51) Int. Cl.
*H04W 74/00* (2009.01)
*H04W 72/04* (2009.01)
(Continued)

(52) U.S. Cl.
CPC ......... *H04W 72/042* (2013.01); *H04L 5/0053* (2013.01); *H04W 72/0406* (2013.01);
(Continued)

(58) Field of Classification Search
CPC .. H04L 5/14; H04W 72/0406; H04W 72/042; H04W 72/0446; H04W 74/00
(Continued)

(56) References Cited

U.S. PATENT DOCUMENTS 8,570,969 B2 * 10/2013 Kim ............... H04L 5/0007
370/329
2009/0168922 A1 * 7/2009 Malladi ............ H04W 72/042
375/316
(Continued)

FOREIGN PATENT DOCUMENTS

KR  10-2008-0099063   11/2008
KR  10-2010-0137357   12/2010
(Continued)

OTHER PUBLICATIONS

R1-121963; 3GPP TSG RAN WG1 Meeting #69; eCCE definition for ePDCCH; May 21-25, 2012.*
(Continued)

*Primary Examiner* — Andrew Lai
*Assistant Examiner* — Mahmudul Hasan
(74) *Attorney, Agent, or Firm* — Lee, Hong, Degerman, Kang & Waimey

(57) ABSTRACT

Disclosed is a method for a base station to transmit a downlink control channel to a terminal in a time division duplex (TDD)-based wireless communication system. Specifically, the method comprises determining the number of basic resource allocation units for each resource block pair for a downlink control channel on the basis of the type of a sub-frame during which the downlink control channel is
(Continued)

transmitted; mapping, by basic resource allocation unit, control information for the terminal to a transmission resource; and transmitting, to the terminal, the downlink control channel comprising the control information, wherein, if the type of the sub-frame is the type in which a downlink transmission interval and a uplink transmission interval coexist, then the number of basic resource allocation unit for each resource block pair is determined on the basis of the length of the downlink transmission interval.

9 Claims, 11 Drawing Sheets

Related U.S. Application Data filed on Aug. 9, 2012, provisional application No. 61/724,302, filed on Nov. 9, 2012.

(51) Int. Cl.
*H04L 5/00* (2006.01)
*H04L 5/14* (2006.01)
*H04L 27/26* (2006.01)

(52) U.S. Cl.
CPC ............ *H04L 5/14* (2013.01); *H04L 27/2607* (2013.01); *H04W 72/0446* (2013.01)

(58) Field of Classification Search
USPC .................................. 370/280, 329; 375/316
See application file for complete search history.

(56) References Cited

U.S. PATENT DOCUMENTS

| | | | | |
|---|---|---|---|---|
| 2009/0180435 A1* | 7/2009 | Sarkar | ...................... | H04L 5/14 370/330 |
| 2010/0290376 A1* | 11/2010 | Dai | ...................... | H04L 5/0007 370/294 |
| 2011/0044215 A1* | 2/2011 | Kim | ...................... | H04B 7/2656 370/280 |
| 2011/0044391 A1* | 2/2011 | Ji | .......................... | H04L 5/0007 375/260 |
| 2011/0096745 A1* | 4/2011 | Ahn | ...................... | H04L 5/0016 370/329 |
| 2011/0103272 A1* | 5/2011 | Dai | ...................... | H04W 72/14 370/280 |
| 2011/0268062 A1* | 11/2011 | Ji | .......................... | H04L 5/0055 370/329 |
| 2011/0269492 A1* | 11/2011 | Wang | ...................... | H04L 5/003 455/509 |
| 2012/0008574 A1* | 1/2012 | Xiao | ...................... | H04L 1/0007 370/329 |
| 2012/0063349 A1* | 3/2012 | Kim | ...................... | H04L 5/0007 370/252 |
| 2012/0120891 A1* | 5/2012 | Mazzarese | .......... | H04W 72/042 370/329 |
| 2012/0122495 A1* | 5/2012 | Weng | .................. | H04W 68/025 455/458 |
| 2012/0252447 A1* | 10/2012 | Sartori | ................ | H04W 72/042 455/434 |
| 2012/0309403 A1* | 12/2012 | Mekhail | ............ | H04W 72/1252 455/450 |
| 2013/0003639 A1* | 1/2013 | Noh | ...................... | H04L 5/0053 370/312 |
| 2013/0039193 A1* | 2/2013 | Yin | ................... | H04W 72/0486 370/252 |
| 2013/0039233 A1* | 2/2013 | Dai | ...................... | H04W 24/10 370/280 |
| 2013/0039284 A1* | 2/2013 | Marinier | ................ | H04L 5/001 370/329 |
| 2013/0195020 A1* | 8/2013 | Frederiksen | ........ | H04W 72/042 370/329 |
| 2013/0208665 A1* | 8/2013 | Baldemair | ............ | H04L 1/0031 370/329 |
| 2013/0223402 A1* | 8/2013 | Feng | ..................... | H04L 5/0007 370/330 |
| 2013/0301542 A1* | 11/2013 | Krishnamurthy | ..... | H04W 52/50 370/329 |
| 2013/0301600 A1* | 11/2013 | Park | ...................... | H04L 1/1861 370/329 |
| 2014/0204854 A1* | 7/2014 | Freda | ........................ | H04L 1/18 370/329 |
| 2015/0009927 A1* | 1/2015 | Larsson | ................ | H04L 1/0007 370/329 |
| 2015/0249985 A1* | 9/2015 | Han | .................. | H04W 72/0446 370/280 |

FOREIGN PATENT DOCUMENTS

| | | |
|---|---|---|
| KR | 10-2011-0000538 | 1/2011 |
| WO | 2011/142641 | 11/2011 |
| WO | 2012/081867 | 6/2012 |

OTHER PUBLICATIONS

R1-121163; 3GPP TSG RAN WG1 Meeting #68bis;Jeju, Korea, Mar. 26-30, 2012; Title: Multiplexing of ePDCCHs and ePDCCH RE mapping.*
R1-121963; 3GPP TSG RAN WG1 Meeting #69;Prague, Czech Republic, May 21-25, 2012 Title: eCCE definition for ePDCCH.*
Catt, "Multiplexing and Resource Mapping for E-PDCCH,"3GPP TSG RAN WG1 #69, R1-122051, May 2012, 4 pages.
European Patent Office Application Serial No. 138090683, Search Report dated Feb. 10, 2016, 7 pages.
Panasonic, "Multiplexing of ePDCCHs and ePDCCH RE mapping", R1-121163, 3GPP TSG RAN WG1 Meeting #68bis, Mar. 2012, 5 pages.
Qualcomm Incorporated, "On Aggregation Levels for ePDCCH", R1-122796, 3GPP TSG RAN WG1 #69, May 2012, 2 pages.
LG Electronics, "On the working assumption of the threshold for EPDCCH search space", R1-124000, 3GPP TSG RAN WG1 Meeting #70, Aug. 2012, 2 pages.
Panasonic, et al., "WF on RE mapping for ePDCCH", R1-123958, 3GPP TSG RAN WG1 Meeting #70, Aug. 2012, 1 page.
Huawei, et al., "eCCE definition for ePDCCH," 3GPP TSG RAN WG1 Meeting #69, R1-121963, May 2012, 4 pages.
LG Electronics, "Discussion on eREG/eCCE definition," 3GPP TSG RAN WG1 Meeting #69, R1-122308, May 2012, 7 pages.
PCT International Application No. PCT/KR2013/000559, Written Opinion of the International Searching Authority dated May 9, 2013, 14 pages.
LG Electronics Inc., "Concept of E-PDCCH CCE," 3GPP TSG RAN WG1 Meeting #68, Feb. 2012, R1-120454, 3 pages.
PCT International Application No. PCT/KR2013/000559, Written Opinion of the International Searching Authority dated May 9, 2013, 1 page.

* cited by examiner

FIG. 2
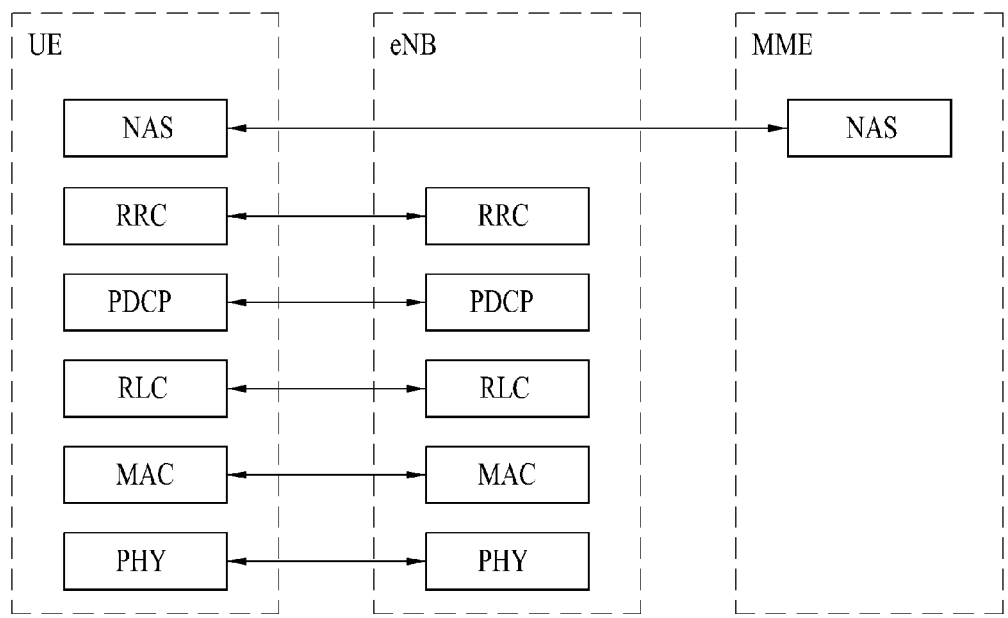
(a) Control-plane protocol stack
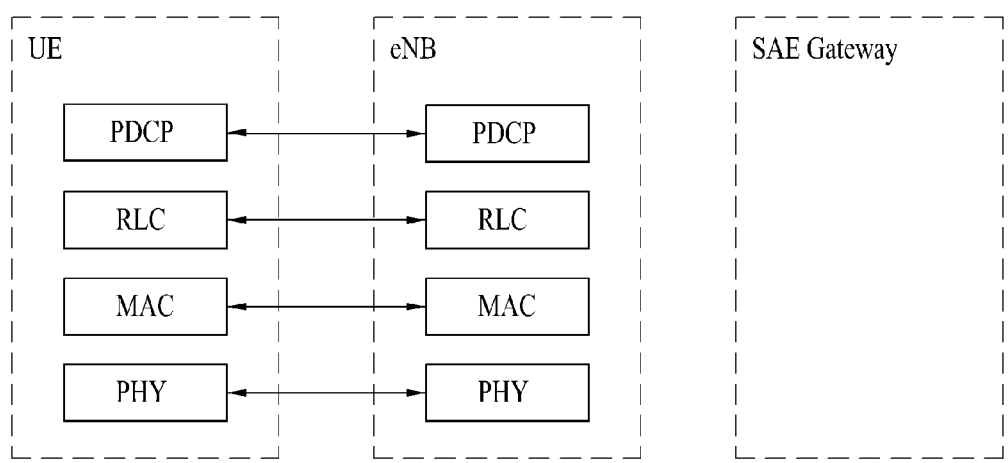
(b) User-plane protocol stack

METHOD AND DEVICE FOR ALLOCATING RESOURCE FOR DOWNLINK CONTROL CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2013/000559, filed on Jan. 24, 2013, which claims the benefit of U.S. Provisional Application Ser. No. 61/664,137, filed on Jun. 25, 2012, 61/681,599, filed on Aug. 9, 2012 and 61/724,302, filed on Nov. 9, 2012, the contents of which are all hereby incorporated by reference herein in their entirety.

TECHNICAL FIELD

The present invention relates to a wireless communication system and, more particularly, to a method and apparatus for allocating resources for a downlink control channel in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for allocating resources for a downlink control channel in a wireless communication system.

Technical Solution

The object of the present invention can be achieved by providing a method for, at a base station, transmitting a downlink control channel to a user equipment (UE) in a wireless communication system of a time division duplex (TDD) scheme including determining the number of resource allocation basic units per resource block pair for the downlink control channel based on a type of a subframe, in which the downlink control channel is transmitted; mapping control information for the UE to transmit resources in the resource allocation basic units; and transmitting the downlink control channel including the control information to the UE, wherein, if the type of the subframe, in which the downlink control channel is transmitted, is a subframe, in which a downlink transmission interval and an uplink transmission interval coexist, the number of resource allocation basic units per resource block pair is determined according to a length of the downlink transmission interval.

In another aspect of the present invention, provided herein is a base station in a wireless communication system of a time division duplex (TDD) scheme including a processor configured to determine the number of resource allocation basic units per resource block pair for a downlink control channel based on a type of a subframe, in which the downlink control channel is transmitted, and to map control information to transmit resources in the resource allocation basic units; and a wireless communication module configured to transmit the downlink control channel including the control information to the UE, wherein the processor determines the number of resource allocation basic units per resource block pair according to a length of the downlink transmission interval, if the type of the subframe, in which the downlink control channel is transmitted, is a subframe, in which a downlink transmission interval and an uplink transmission interval coexist.

If the length of the downlink transmission interval is equal to or greater than a first threshold, the number of resource allocation basic units per resource block pair may be determined as a first value, and, if the length of the downlink transmission interval is less than the first threshold, the number of resource allocation basic units per resource block pair may be determined as a second value which is less than the first value.

If the length of the downlink transmission interval is less than the second threshold which is less than the first threshold, the number of resource allocation basic units per resource block pair may be determined as 0, that is, the subframe may not be used as transmit resources for the downlink control channel.

If the type of the subframe, in which the downlink control channel is transmitted, is a subframe, in which only the downlink transmission interval is present, the number of resource allocation basic units per resource block pair may be determined as the first value. The first value may be 4 and the second value may be 2.

Advantageous Effects

According to embodiments of the present invention, it is possible to efficiently allocate resources for a downlink control channel.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
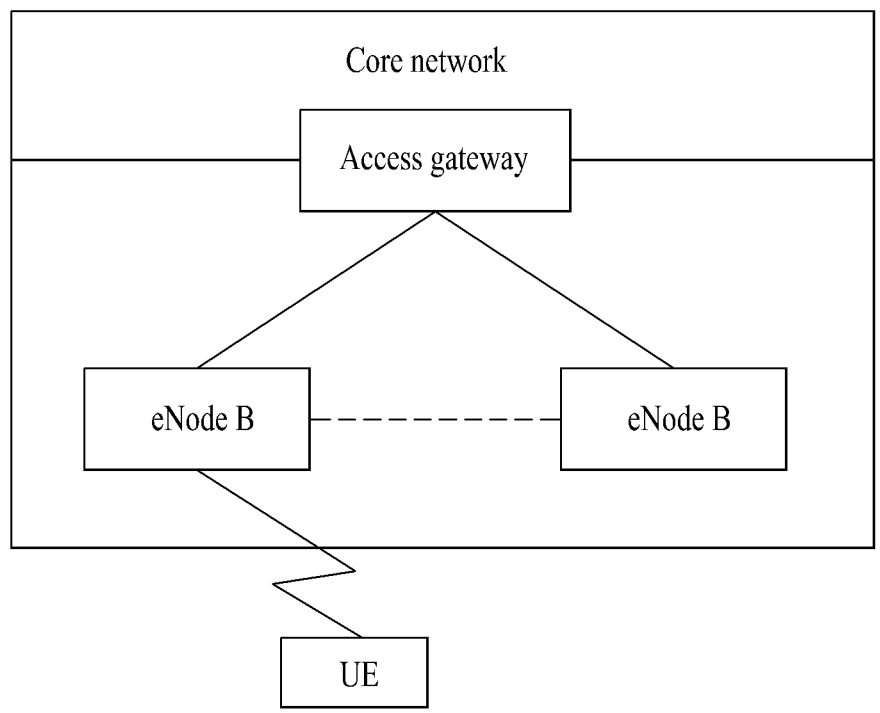
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
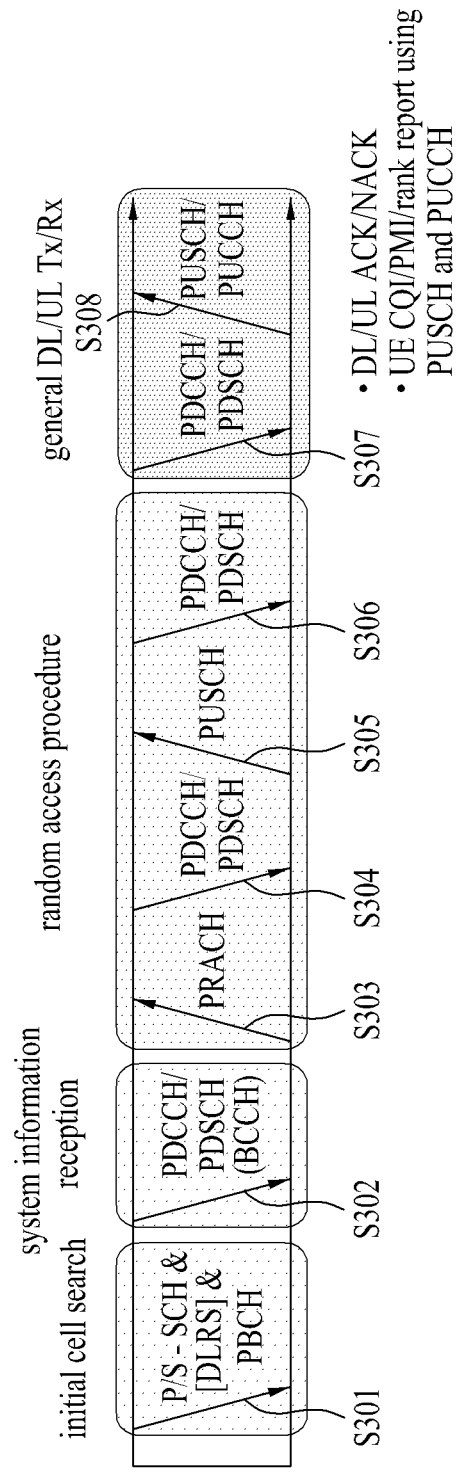
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 4:
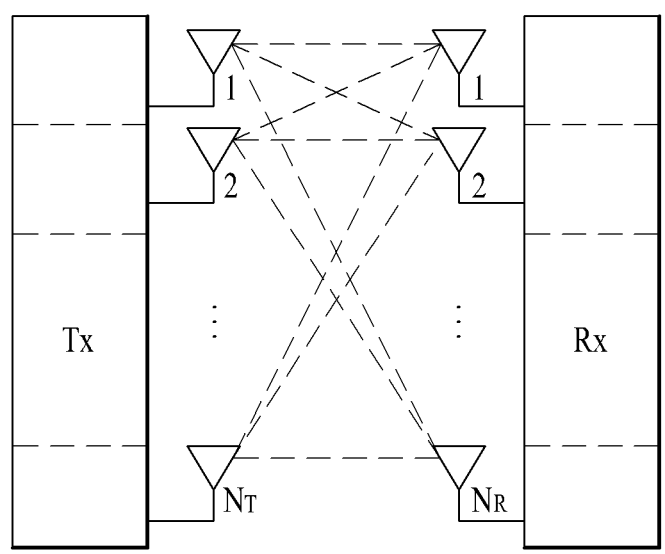
FIG. 4 is a diagram showing the configuration of a multi-antenna communication system.

The configuration of the general multi-antenna (MIMO) communication system is shown in FIG. 4. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \quad \text{Equation 1}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

Figure 7:
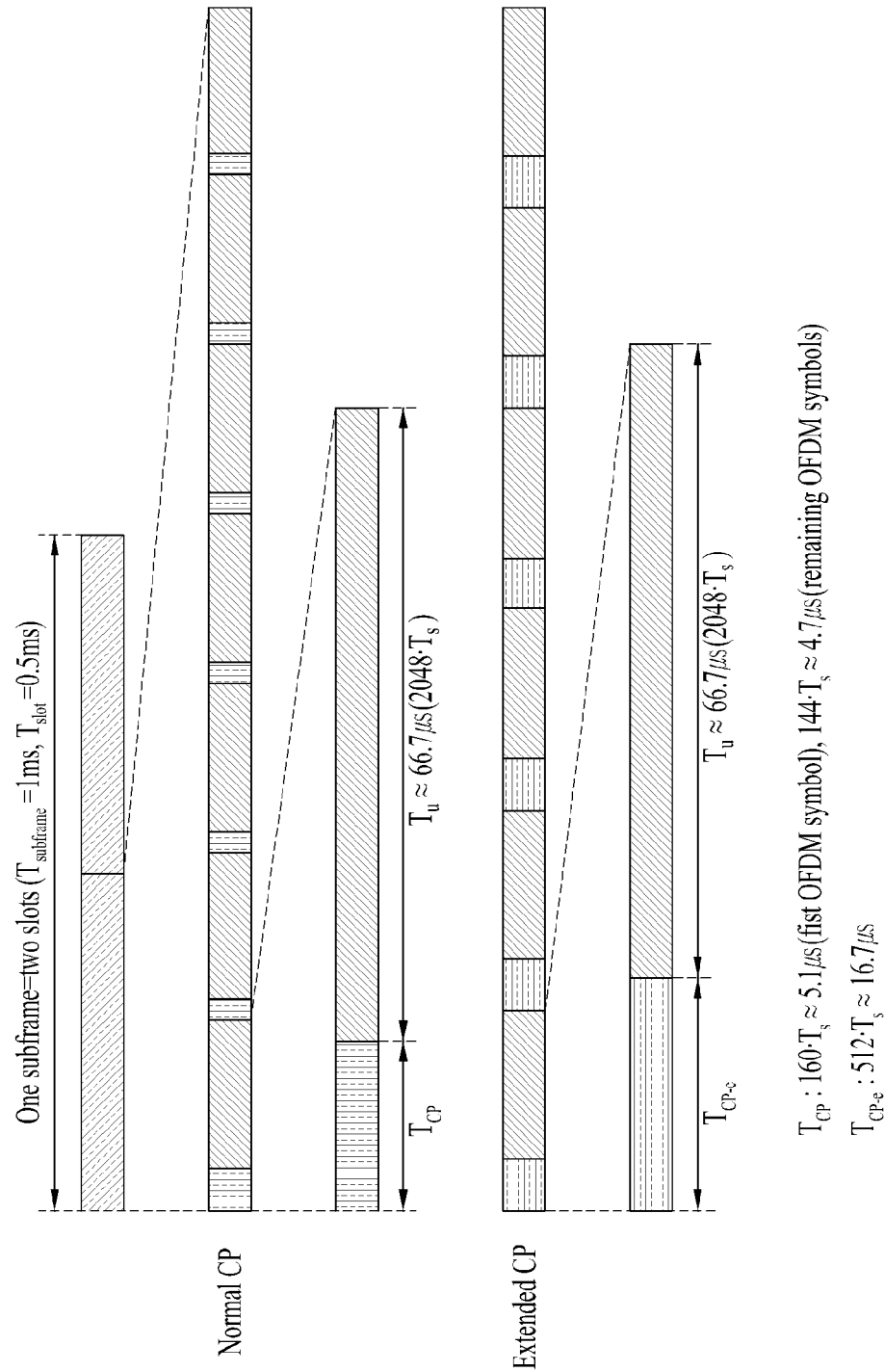
FIG. 7 is a diagram showing the structure of a frame used in an LTE system.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{Equation 3}$$

In addition, $\hat{S}$ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} \quad \text{Equation 5}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{Equation 6}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{Equation 7}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Figure 5:
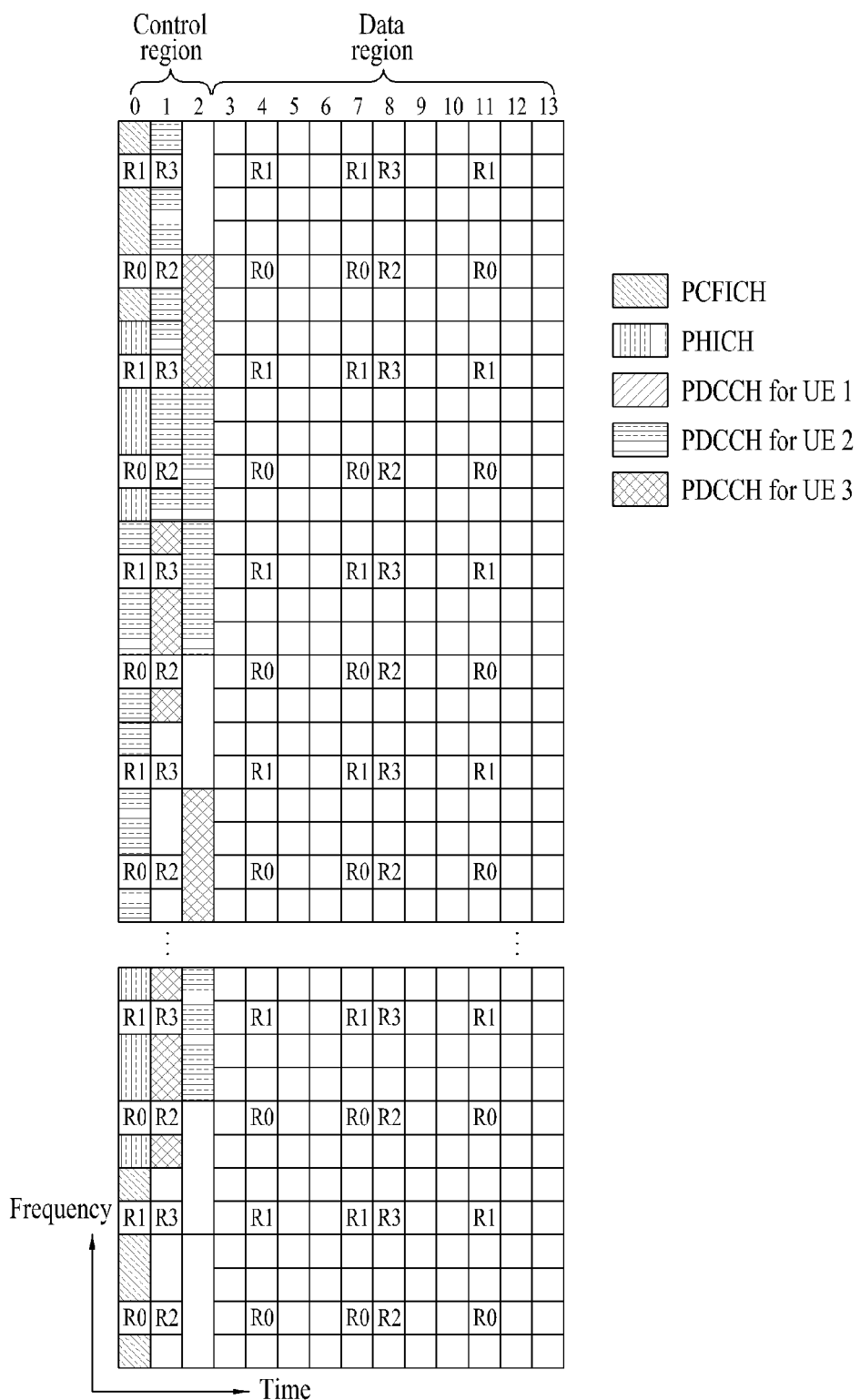
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The RE indicates minimum physical resource defined as one sub-carrier×one OFDM symbol. The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

A basic resource unit of a downlink control channel is a resource element group (REG). The REG includes four neighboring available REs except for an RS. A PCFICH and a PHICH includes four REGs and three REGs, respectively. A PDCCH is configured in control channel elements (CCEs) and one CCE includes nine REGs.

A UE is set to confirm $M^{(L)}(\geq L)$ CCEs which are arranged consecutively or in a specific rule, in order to determine whether a PDCCH including L CCEs is transmitted to the UE. The UE may consider a plurality of L values, for PDCCH reception. A set of CCEs which should be confirmed by the UE for PDCCH reception is referred to as a search space. For example, an LTE system defines the search space as shown in Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 2B, |
|  | 2 | 12 | 6 | 1D, 2, 2A, 2B, 4 |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A CCE aggregation level L denotes the number of CCEs configuring a PDCCH, $S_k^{(L)}$ denotes a search space of the CCE aggregation level L, and $M^{(L)}$ denotes the number of candidate PDCCHs which should be monitored in the search space of the aggregation level L.

The search space may be divided into a UE-specific search space in which only access of a specific UE is allowed and a common search space in which access of all UEs in a cell is allowed. A UE monitors common search spaces having CCE aggregation levels of 4 and 8 and monitors UE-specific search spaces having CCE aggregation levels of 1, 2, 4 and 8. The common search space and the UE-specific search space may overlap.

In a PDCCH search space applied to an arbitrary UE with respect to each CCE aggregation level value, the location of a first CCE (having a smallest index) is changed according to subframe. This is referred to as PDCCH search space hashing.

The CCE may be distributed in a system band. More specifically, a plurality of logically contiguous CCEs may be input to an interleaver and the interleaver serves to interleave the input CCEs in REG units. Accordingly, frequency/time resources configuring one CCE are physically scattered and distributed in the whole frequency/time region within a control region of a subframe. As a result, the control channel is configured in CCE units but interleaving is performed in REG units, thereby maximizing frequency diversity and interference randomization gain.

Figure 6:
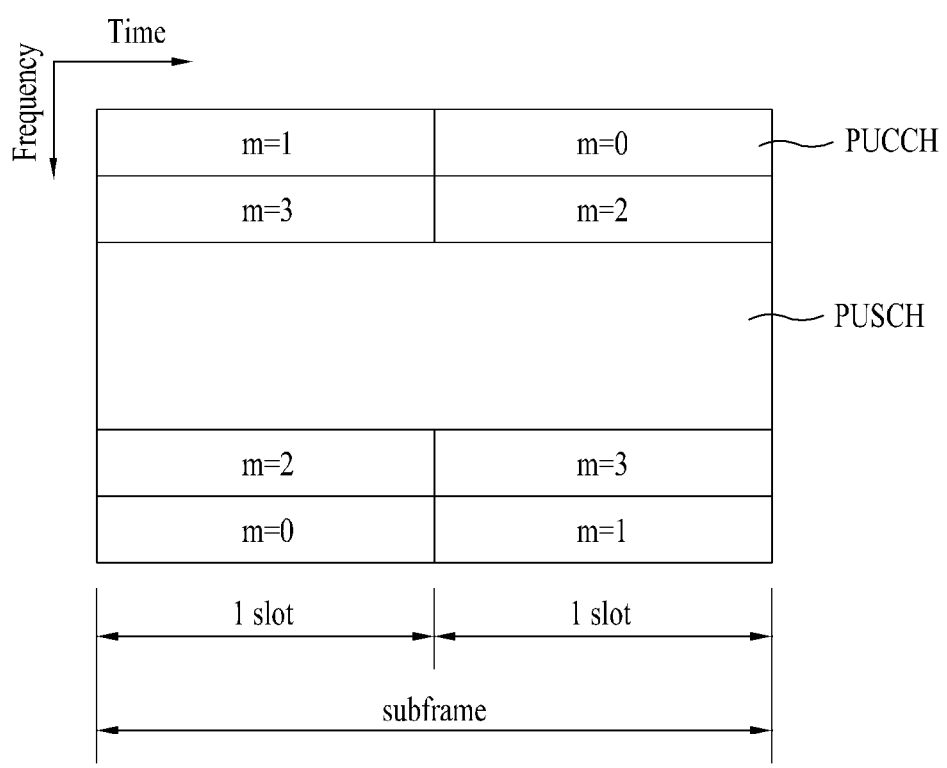
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

FIG. 7 is a diagram showing the structure of a frame of an LTE system.

In the LTE system, as shown in FIG. 7, two types of frame structures are supported, in order to enable the LTE system to support various scenarios of a cellular system. The LTE system cover indoor, urban, suburban and rural environments and a movement speed of a UE may reach up to 350 km/h to 500 km/h. A center frequency used for the LTE system is generally 400 MHz to 4 GHz and an available frequency band is 1.4 MHz to 20 MHz. This means delay speed and Doppler frequency may be changed according to the center frequency and the available frequency band.

More specifically, in case of a normal cyclic prefix (CP), subcarrier spacing is $\Delta f=15$ kHz and the length of the CP is about 4.7 μs. In case of an extended CP, subcarrier spacing is also $\Delta f=15$ kHz but the length of the CP is 16.7 μs, which is greater than that of the normal CP. The extended CP may support a relatively wide suburban or rural cell due to the large CP length.

In general, since delay verification is increased in a suburban or rural cell, the extended CP having a relatively long interval is required in order to solve ISI. However, due to overhead increase such as relative reduction of a valid signal transmission interval, frequency efficiency is reduced and transmit resources are lost. That is, there is a trade-off.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with such a high density of nodes. In such a system, each node operates as an independent base station (BS), an advanced BS (ABS), a node B (NB), an eNodeB (eNB), an access point (AP), etc. and is far superior performance to a non-coordinated system.

Figure 8:
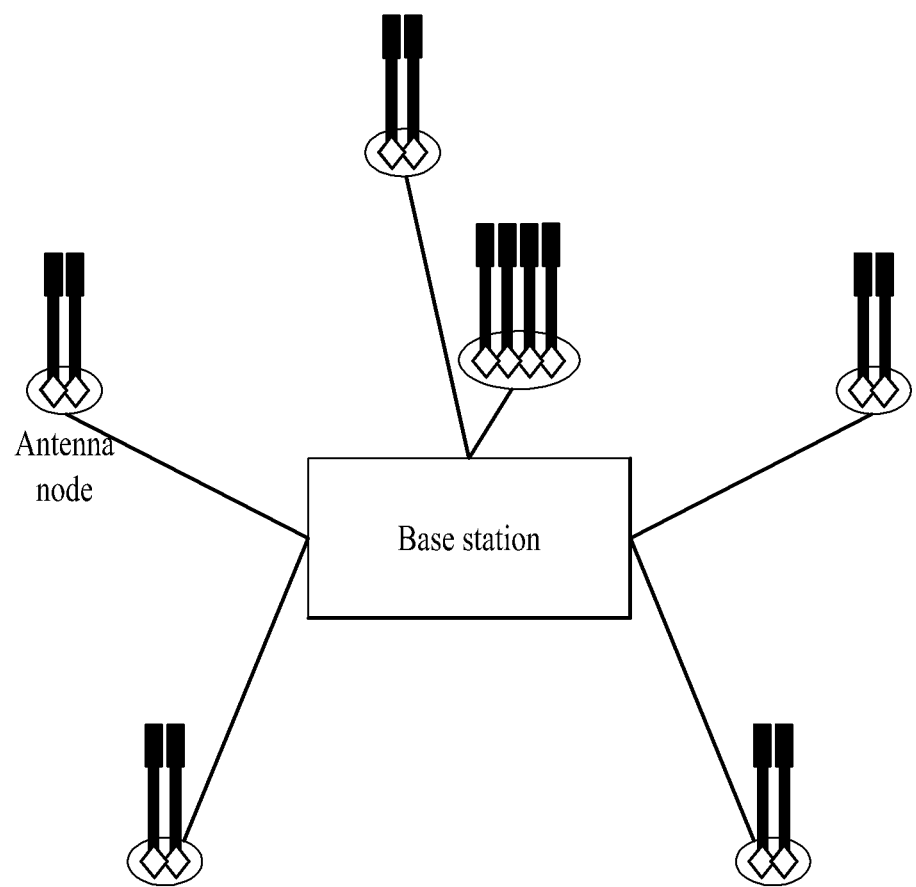
FIG. 8 is a diagram showing a multi-node system in a next-generation communication system.

FIG. 8 is a diagram showing a multi-node system in a next-generation communication system.

Referring to FIG. 8, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated at a predetermined spacing or more, the present invention is applicable to an arbitrary group of nodes defined regardless of a spacing.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (E-PDCCH) is being discussed as a newly introduced control channel and is allocated to a data region (hereinafter, referred to as a PDSCH region), not to an existing control region, (hereinafter, referred to as a PDCCH region). In conclusion, control information of a node can be transmitted to each UE via such an E-PDCCH so as to solve a problem that an existing PDCCH region is insufficient. For reference, the E-PDCCH may not be transmitted to a legacy UE but may only be transmitted to an LTE-A UE. In addition, the E-PDCCH is transmitted and received not based on a cell-specific reference signal (CRS) but based on a demodulation reference signal (DM-RS) which is a UE-specific reference signal.

Figure 9:
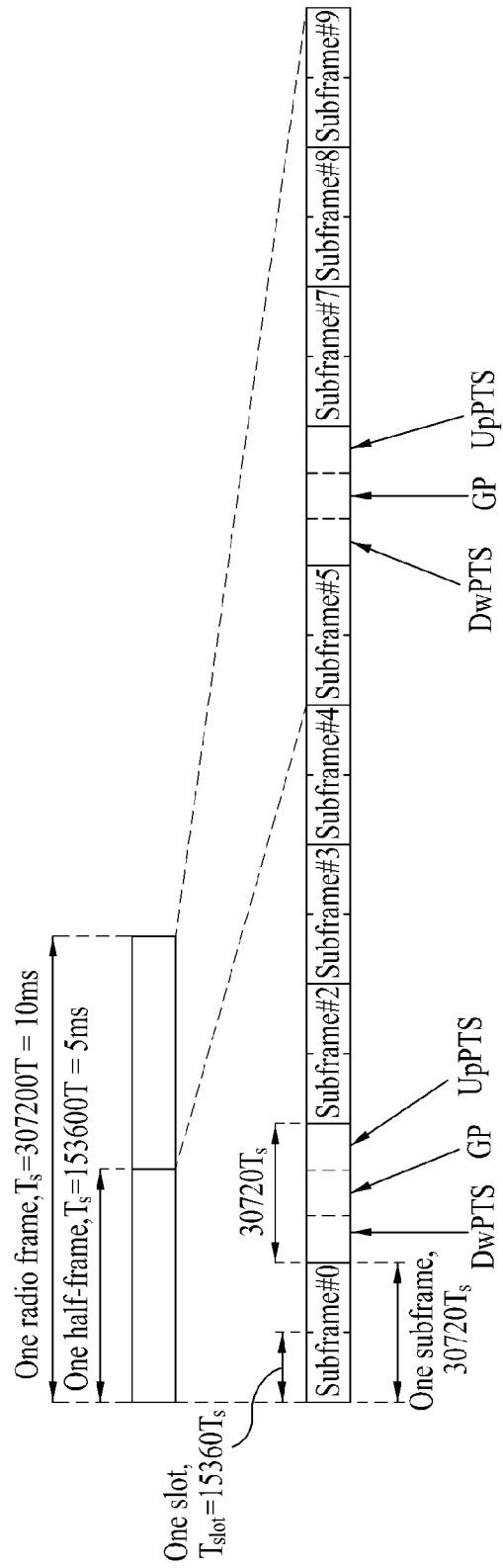
FIG. 9 is a diagram showing an E-PDCCH and a PDSCH scheduled by an E-PDCCH.

FIG. 9 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 2 below in the 3GPP standard. Table 2 shows the DwPTS and the UpPTS in case of $T_s=1/(15000\times2048)$. The remaining region is configured as a guard period.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · T, | 2192 · T, | 2560 · T, | 7680 · T, | 2192 · T, | 2560 · T, |
| 1 | 19760 · T, | | | 20480 · T, | | |
| 2 | 21952 · T, | | | 23040 · T, | | |
| 3 | 24144 · T, | | | 25600 · T, | | |
| 4 | 26336 · T, | | | 7680 · T, | 4384 · T, | 5120 · T, |
| 5 | 6592 · T, | 4384 · T, | 5120 · T, | 20480 · T, | | |
| 6 | 19760 · T, | | | 23040 · T, | | |
| 7 | 21952 · T, | | | — | — | — |
| 8 | 24144 · T, | | | — | — | — |

In the LTE TDD system, an uplink/downlink (UL/DL) configuration is shown in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, D denotes a downlink subframe, U denotes an uplink subframe and S denotes the special subframe. Table 2 above shows a downlink-to-uplink switch-point periodicity in the UL/DL configuration in each system.

Figure 10:
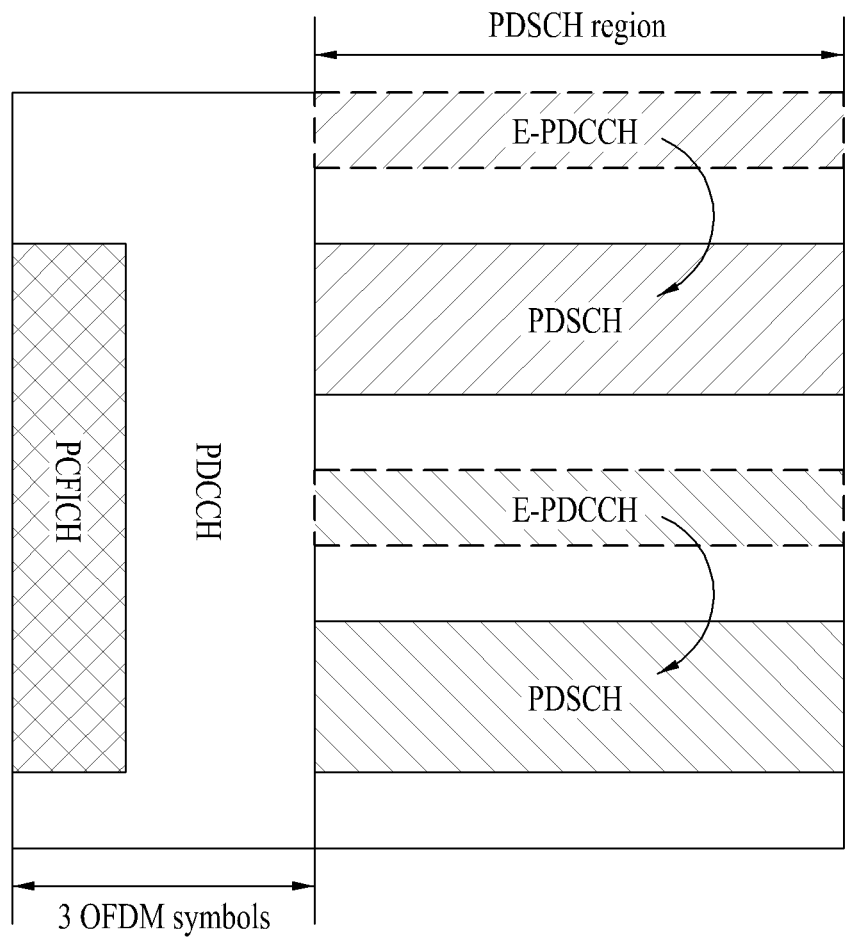
FIG. 10 is a diagram showing an example of a PDCCH region and an E-PDCCH region in one subframe.

FIG. 10 is a diagram showing an E-PDCCH and a PDSCH scheduled by the E-PDCCH.

Referring to FIG. 10, the E-PDCCH may be generally transmitted via a PDSCH region for transmitting data. A UE should perform a blind decoding process of a search space for the E-PDCCH in order to detect presence/absence of the E-PDCCH thereof.

The E-PDCCH performs the same scheduling operation (that is, PDSCH or PUSCH control) as the existing PDCCH. However, if the number of UEs accessing a node such as an RRH is increased, a larger number of E-PDCCHs is allocated to a PDSCH region, thereby increasing the number of times of blind decoding to be performed by the UE and increasing complexity.

As described above, an eNB transmits downlink control information (DCI) containing control information of each UE via a control channel, that is, a PDCCH. In addition, DCI is configured in CCE units. If a channel state is bad or if the size of DCI is too large to obtain sufficient channel coding gain using one CCE, 2, 4, 8 or more CCEs may be aggregated to generate one DCI and one PRB pair may be composed of one or more CCEs.

However, since the E-PDCCH may be transmitted in a PDSCH region, not in a PDCCH region, similarly to an existing method and the number of available REs may be changed within one PRB pair according to subframe configuration, the size and number of E-CCEs for the E-PDCCH may be determined according to the number of available REs.

In addition, unlike a PDCCH in which DCI is multiplexed over an entire band, in an E-PDCCH considering resource allocation in a PDSCH region, E-CCEs may be defined in one PRB pair or may be allocated to a plurality of PRB pairs. One or a plurality of E-REGs which is a resource allocation unit configuring the E-CCE may be aggregated to generate one E-CCE. In addition, in a new carrier type (NCT), which is modified from an existing subframe structure, the number of E-CCEs defined in the PRB pair may also be changed according to the characteristics of the NCT.

Accordingly, the present invention proposes a method for determining the number of E-CCEs and E-REGs defined in one PRB pair according to subframe configuration and presence of an overhead signal.

First Embodiment

First, as in a CCE which is a basic unit for transmitting DCI in a PDCCH, in order to define an E-CCE as a basic unit capable of completely containing one DCI, the E-CCE may have a size similar to that of an existing CCE, that is, may be composed of 36 REs. If a channel environment is bad or if the size of DCI is very large, a plurality of E-CCEs may be aggregated, similarly to aggregation of a plurality of CCEs in the PDCCH.

Alternatively, the number of E-CCEs configuring one PRB pair may be determined depending on whether the number of available REs for an E-CCE within one PRB pair is equal to or greater than a threshold. For example, if the threshold is 104, if 104 or more REs are present in one subframe, four E-CCEs may be configured and if less than 104 REs are present in one subframe, two E-CCEs may be configured. In this case, if each E-CCE has 26 REs and DCI having a size of 45 bits is transmitted using one E-CCE, a coding rate of 0.865 (=45/(26*2)) is obtained. The threshold may be determined as a specific value between an eNB and a UE or may be signaled from an eNB to a UE via RRC signaling.

The number of available REs may be differently determined within the PRB pair according to subframe type.

Subframe type may be classified according to purpose of use thereof. For example, the subframe may be classified into a normal subframe used for normal data transmission in both an FDD scheme and a TDD scheme and a special subframe used to switch a subframe when a downlink subframe and an uplink subframe are switched in the TDD scheme. At this time, even in the special subframe, downlink data transmission and uplink data reception are possible and the number of available symbols in a downlink subframe interval (that is, DwPTS) for E-PDCCH transmission may be changed according to the configuration of the special subframe. Accordingly, the number of available REs for the E-PDCCH is also determined according to the configuration of the special subframe.

In addition, subframe type may be classified according to CP type for determining the number of OFDM symbols. For example, a normal CP suitable for a cell environment in which a maximum delay profile is not large and an extended CP suitable for an environment in which a maximum delay profile is large by covering a wide cell radius for an MBSFN are used.

In addition, subframe type may be classified depending on whether channels or signals for initial access, such as PBCH, PSS or SSS, are allocated. If channels or signals, such as PBCH, PSS or SSS, are allocated to a specific PRB pair of a specific subframe, the number of available REs may be regarded as being slightly reduced and the PRB pair for PBCH/PSS/SSS of the subframe may be used for the E-PDCCH. If collision with a UE-specific reference signal occurs, the PRB pair may not be used for the E-PDCCH.

The search space of the E-PDCCH may include not only a normal PRB pair in which a PBCH/PSS/SSS is not transmitted but also a PRB pair in which a PBCH and/or a PSS and/or an SSS are transmitted. If the number of available REs is calculated while ignoring REs allocated to the PBCH and/or the PSS and/or the SSS belonging to the search space of the E-PDCCH, since it is difficult to accurately calculate the number of available REs which may be a criterion for determining the number of E-CCEs, the signals of the PBCH and/or the PSS and/or the SSS belonging to the search space may also be used to calculate the number of available REs. For example, if subframe #6 of a TDD scheme is not used as a special subframe but is used as a downlink subframe, even when a PSS is transmitted in subframe #6, the PSS does not collide with a DM-RS which is a UE-specific RS and thus the PRB pair may be used for the E-PDCCH.

Hereinafter, a method for determining the number of E-CCEs and the number of E-REGs per PRB pair in consideration of the above-described subframe configuration and the number of available REs will be proposed.

a) First, when one E-CCE is a minimum unit for independently transmitting a specific E-PDCCH, due to characteristics of control information, the E-PDCCH should be transmitted at a predetermined coding rate or less. That is, the number of REs configuring one E-CCE should be equal to or greater than a specific threshold. Accordingly, if the number of available REs is changed by another overhead signal, the number of E-CCEs should be changed. The specific threshold may be predetermined as a specific value between the eNB and the UE or may be signaled from the eNB to the UE via RRC signaling.

b) If the number of E-CCE in one PRB pair is fixed, the UE may fixedly set a search space for an E-PDCCH regardless of subframe and the eNB may define resources for the E-PDCCH in a space other than a space for an important or fixed signal, such as a DM-RS which is a UE-specific RS, and use a rate matching or puncturing scheme according to presence of other signals. In this case, since the number of available REs is very small, the number of REs configuring one E-CCE is very small and thus a specific E-PDCCH message may not be independently transmitted. At this time, two or more E-CCEs may be combined to generate a super E-CCE and, if the super E-CCE is used as a basic aggregation unit, the same operation as the method for changing the number of E-CCEs may be performed.

c) If a normal CP is used in a normal subframe, on the assumption that a region to which a UE-specific RS may be allocated, that is, all 24 REs to which the UE-specific RS may be mapped, is not available, the number of available REs per PRB pair is 144 (128 in case of an extended CP). In this case, a maximum of four E-CCEs is preferably used and a smaller number of E-CCEs may be used according to overhead of another signal or according to change in size of the E-CCE.

Similarly, use of 72 or fewer REs (64 REs in case of an extended CP) per PRB pair is equal to use of half or less than half of the PRB pair and thus a maximum of two or less E-CCEs are used. Further, if 36 or fewer REs per PRB pair are used, one E-CCE is defined from one PRB pair or, if one E-CCE is not defined, one or more E-REGs are defined or no E-PDCCH is transmitted. Accordingly, in the normal subframe, the number of E-CCEs configuring the PRB pair is determined based on the maximum number of available REs except for the DM-RS.

d) In a special subframe, the pattern of a UE-specific RS may be changed according to a special subframe configuration and overhead of the UE-specific RS may be changed according to the length of a DwPTS changed according to the special subframe configuration or the number of available REs in one PRB pair. That is, all or some of UE-specific RSs may be included in one PRB pair and, if the DwPTS is very short, no UE-specific RS may be included or RE pairs to which the reference signals are mapped may not be partially used. If the length of the symbol used as the DwPTS is less than the length of one slot, half or less than half of the PRB pair is used and a maximum of two or fewer E-CCEs is preferably used rather than using two or more E-CCEs.

Accordingly, in the special subframe, in addition to the number of REs which is the criterion for determining in the number of E-CCEs in the normal subframe, the number of E-CCEs configuring the PRB pair is determined based on the length of the symbol used as the DwPTS or depending on whether the UE-specific RS is included if the UE-specific RS is uniformly distributed per slot.

e) Further, when a signal such as PBCH/PSS/SSS is transmitted on a specific PRB pair, if only the number of available REs is reduced, the number of E-CCEs per PRB pair may be determined based on the number of available REs.

However, if a signal such as the PBCH/PSS/SSS collides with the UE-specific RS, the UE-specific RS colliding with the RE may not be transmitted. At this time, if the subframe configuration including only UE-specific RSs except for the colliding UE-specific RS is equal or similar to a specific subframe configuration, the number of E-CCEs per PRB in the subframe configuration may be determined.

f) One E-CCE may be composed of one or more E-REGs and, when a minimum number of E-REGs necessary to configure one E-CCE is m, the number of E-REGs defined in one PRB is also determined if the number of E-CCEs maximally used in one PRB pair is determined in a specific or special subframe configuration.

If the maximum number of E-CCEs configuring one PRB pair in the specific or special subframe configuration is n, the number of E-REGs per PRB pair is N=m×n. For example, in a subframe configuration or a special subframe configuration capable of generating a maximum of four E-CCEs, 4×m E-REGs are defined and, in a configuration capable of generating a maximum of two E-CCEs, 2×m E-REGs are defined. However, the actual number of E-CCEs defined in one PRB pair may be changed according to the number of available REs except for the overhead signal such as the PDCCH signal or CSI-RS.

When the number of E-REGs configuring one PRB pair is fixed to N, the number of available REs in the RPB pair may be changed according to presence of other overhead signals such as the above-described PDCCH or CSI-RS and the number of REs configuring one E-REG may also be changed. When the number of E-CCEs included in one PRB pair is k, one E-CCE may be composed of $$\text{floor}\left(\frac{N}{k}\right) \text{ or } \text{ceil}\left(\frac{N}{k}\right)$$

E-REGs or an integer number (the integer being close to $$\text{floor}\left(\frac{N}{k}\right) \text{ or } \text{ceil}\left(\frac{N}{k}\right))$$

of E-REGs. Here, floor(x) is a function representing a maximum integer less than or equal to x and ceil(x) is a function representing a minimum integer greater than or equal to x. At this time, in the subframe configuration having the same UE-specific RS mapping pattern, the same E-REG definition and the same E-REG to RE mapping pattern may be assumed.

The above description will be summarized in the following 1) to 10).

1) First, if a normal subframe is used, the maximum number of available REs is 144 in case of a normal CP and is 128 in case of an extended CP. Accordingly, in the normal subframe which is not used to transmit a PBCH/PSS/SSS or a special subframe, one PRB pair is divided into a maximum of four E-CCEs.

2) Second, if a special subframe is used, the number of available REs and the number of symbols used for downlink in case of the normal CP are shown in Table 4 below. Table 4 shows the DwPTS length and the number of available REs according to special subframe configuration and the number of E-CCEs per PRB pair according thereto.

TABLE 4

| | | Special subframe configuration | | | | | | | | | |
|---|---|---|---|---|---|---|---|---|---|---|---|
| | | 0 | 1 | 2 | 3 | 4 | 5 | 6 | 7 | 8 | 9 |
| DwPTS length (number of symbols) | | 3 | 9 | 10 | 11 | 12 | 3 | 9 | 10 | 11 | 6 |
| Available RE | Number of UE-specific RSs: 0 | 36 | 108 | 120 | 132 | 144 | 36 | 108 | 120 | 132 | 72 |
| | Number of UE-specific RSs: 12 | — | 96 | 108 | 120 | 132 | — | 96 | 108 | 120 | 60 |
| | Number of UE-specific RSs: 24 | — | 84 | 96 | 108 | 120 | — | 84 | 96 | 108 | 48 |
| Number of E-CCEs per PRB pair | | 0 | 2 | 2 | 4 | 4 | 0 | 2 | 2 | 4 | 2 |

Referring to Table 4 above, in special subframe configurations 0 and 5 in which the DwPTS symbol length is very short and the UE-specific RS is not defined, the E-PDCCH is not transmitted. If special subframe configuration 9 is set and a maximum of two antenna ports is used such that a maximum of two E-CCEs may be allocated to each PRB pair, overhead of the UE-specific RS is 6 REs, the maximum number of available REs is 66, and 33 REs may be allocated to one E-CCE on average.

In addition, if a maximum of four antenna ports is used such that a maximum of four E-CCEs may be allocated to each PRB pair, overhead of the UE-specific RS is 12 REs, the maximum number of available REs is 60, and 15 REs may be allocated to one E-CCE on average. In a current LTE system, except for DCI format 1C corresponding to compact downlink grant, DCI having the smallest size is DCI format 1A consisting of 42 bits. When a minimum coding rate necessary for DCI transmission is 0.75, 28 or more REs are minimally necessary per E-CCE in order to modulate a message such as DCI format 1A with QPSK and to transmit the message on one E-CCE. Accordingly, if special subframe configuration 9 is set, allocation of four E-CCEs to one PRB pair is not suitable but the PRB pair is divided into a maximum of two E-CCEs.

Remaining special subframe configurations 1, 2, 6 and 7 and special subframe configurations 3, 4 and 8 have the same UE-specific RS mapping pattern. At this time, in special subframe configuration 2 or 7, if a maximum of four E-CCEs is allocated, one E-CCE has 24 REs and thus a condition for transmitting DCI 1A on one E-CCE at a coding rate of 0.75 or less is not satisfied. Accordingly, in special subframe configurations 1, 2, 6 and 7, one PRB pair is divided into a maximum of two E-CCEs and, in special subframe configurations 3, 4 and 8, one PRB pair is divided into a maximum of four E-CCEs.

Table 5 shows the DwPTS length and the number of available REs according to special subframe configuration and the number of E-CCEs per PRB pair according thereto.

TABLE 5

| | | Special subframe configuration | | | | | | |
|---|---|---|---|---|---|---|---|---|
| | | 0 | 1 | 2 | 3 | 4 | 5 | 6 |
| DwPTS length (number of symbols) | | 3 | 8 | 9 | 10 | 3 | 8 | 9 |
| Available RE | Number of UE-specific RSs: 0 | 36 | 96 | 108 | 120 | 36 | 96 | 108 |
| | Number of UE-specific RSs: 8 | — | 88 | 100 | 112 | — | 88 | 100 |
| Number of E-CCEs per PRB pair | | 0 | 2 | 2 | 2, 4 | 0 | 2 | 2 |

Referring to Table 5, in special subframe configurations 0 and 4 in which the DwPTS symbol length is very short and the UE-specific RS is not defined, the E-PDCCH is not transmitted. If it is assumed that one E-CCE is set in one antenna port, in configurations other than special subframe configurations 0 and 4, one PRB pair may be divided into a maximum of two E-CCEs. If it is assumed that a plurality of E-CCEs shares one antenna port, one PRB pair may be divided into a maximum of four E-CCEs in special subframe configuration 3.

3) Third, in a subframe and PRB pair in which a PSS or an SSS is not transmitted but only a PBCH is transmitted, four symbols are used as a PBCH region, which may be similar to special subframe configuration 2 of a TDD scheme in case of the normal CP or special subframe configuration 1 of a TDD scheme in case of the extended CP, in terms of the number of available REs. Accordingly, in the subframe in which the PSS or SSS is not transmitted but only the PBCH is transmitted, one PRB pair may be divided into a maximum of two E-CCEs.

4) Fourth, in a subframe and PRB pair in which a PSS or an SSS is transmitted using an FDD scheme, if the normal CP is used, the PSS or SSS symbol and the UE-specific RS collide with each other and thus the E-PDCCH is not transmitted when only the PSS or SSS is transmitted in the normal subframe of the FDD scheme.

5) Fifth, in a normal subframe of a TDD scheme, only a PSS may be transmitted. That is, the number of symbols is reduced by 1 as compared to the normal subframe. One PRB pair is composed of a maximum of 132 REs (24 RE UE-specific RSs) in the normal CP and is composed of a maximum of 116 REs in the extended CP. Accordingly, if only the PSS is transmitted in the normal subframe of the TDD scheme, one PRB pair may be divided into a maximum of four E-CCEs.

6) Sixth, if only a PSS is transmitted in a special subframe of a TDD scheme, in the normal CP, the UE-specific RS is not defined or only a configuration in which the PSS symbol and the UE-specific RS collide with each other is present. Therefore, when only the PSS is transmitted in the special subframe of the TDD scheme, in the normal CP, the E-PDCCH is not transmitted.

7) Seventh, if only a PSS is transmitted in a special subframe of a TDD scheme, in the case of the extended CP, as shown in Table 6 below, the number of symbols is reduced by 1 as compared to the normal subframe and the extended CP.

TABLE 6

| | Special subframe configuration | | | | | | |
|---|---|---|---|---|---|---|---|
| | 0 | 1 | 2 | 3 | 4 | 5 | 6 |
| DwPTS length (number of symbols) | 3 | 8 | 9 | 10 | 3 | 8 | 9 |
| Available RE Number of UE-specific RSs: 0 | 24 | 84 | 96 | 108 | 36 | 84 | 96 |
| Number of UE-specific RSs: 8 | — | 76 | 88 | 100 | — | 76 | 88 |
| Number of E-CCEs per PRB pair | 0 | 2 | 2 | 2 | 0 | 2 | 2 |

That is, in special subframe configurations 0 and 4 in which the DwPTS symbol length is very short and the UE-specific RS is not defined, the E-PDCCH is not transmitted and, in the other configurations, one PRB pair may be divided into a maximum of two E-CCEs.

8) Eighth, if an SSS is transmitted in a normal subframe of a TDD scheme and the normal CP is used, the SSS symbol and the UE-specific RS collide with each other. Therefore, when only the SSS is transmitted in the normal subframe of the TDD scheme, in the normal CP, the E-PDCCH is not transmitted.

9) Ninth, if only an SSS is transmitted in a normal subframe of a TDD scheme and the extended CP is used, the number of symbols is reduced by 1 as compared to the normal subframe (and the extended CP) and the maximum number of available REs is 116. Accordingly, if only the SSS is transmitted in the normal subframe of the TDD scheme and the extended CP is used, one PRB pair may be divided into a maximum of four E-CCEs.

10) Tenth, if a PBCH and an SSS are transmitted in a normal subframe of a TDD scheme and the extended CP is used, the number of symbols is reduced by 5 as compared to the normal subframe (and the extended CP) and the maximum number of available REs is 68. Accordingly, if the PBCH and the SSS are transmitted in the normal subframe of the TDD scheme and the extended CP is used, one PRB pair may be divided into a maximum of two E-CCEs.

Second Embodiment

In the above-described NCT, only the E-PDCCH is present but no PDCCH is present. However, a PDCCH region may be empty for the purpose of coordinating interference with a PDCCH of a neighbor cell. In addition, if an E-PDCCH is allocated from a specific start symbol, the number of available REs for the E-PDCCH is similar to that of the case in which a PDCCH is present and needs to be considered when the number of CCEs is determined.

Further, the NCT is designed to avoid partial collision or overall collision between the PBCH/PSS/SSS and the DM-RS. In the NCT, since no PDCCH is present and no antenna port for a cell-specific RS (CRS) is present or only one antenna port for a CRS is present, even when the PBCH/PSS/SSS is transmitted, the number of available REs may be significantly large as compared to the existing case. Accordingly, even when the PBCH/PSS/SSS is transmitted, the E-PDCCH needs to be transmitted.

Accordingly, the number of E-CCEs per PRB in the subframe in which the PBCH/PSS/SSS is not transmitted may be equal to that in a non-NCT case. If the PBCH/PSS/SSS is transmitted, the number of E-CCEs is determined according to the number of available REs. This will now be described.

A. Normal Subframe in NCT (1) Normal Subframe in which the PBCH is not Transmitted If the E-PDCCH is allocated from a $0^{th}$ symbol, because no PDCCH is present, a maximum of 144 REs may be used in the normal CP and a maximum of 128 REs may be used in the extended CP, as the E-CCE. In an existing system, if one antenna port is used for CRS, the number of available REs is reduced by 8. If the number of REs considered in order to set the number of E-CCEs to 2 or 4 is 104, a maximum of four E-CCEs may be defined even when the CRS is used.

However, if the PSS/SSS is transmitted, the number of available REs is reduced by 12 or if the PSS/SSS is transmitted in the same subframe, the number of available REs is reduced by 24. In this case, in the normal CP/extended CP, a maximum of four E-CCEs may be defined. In the extended CP, if the maximum number of available DM-RS ports is defined as 2, only two E-CCEs may be defined. Even when the CRS and the PSS/SS are transmitted together, a maximum of four E-CCEs may be defined in the normal CP and a maximum of two or four E-CCEs may be defined according to the number of available REs in the extended CP.

At this time, if the index of the E-PDCCH start symbol has a specific value other than 0, the number of E-CCEs may be determined according to the number of available REs, which is equal to the first embodiment which is a non-NCT case.

(2) Normal Subframe in which the PBCH is Transmitted

Unlike an existing PBCH structure, if transmission is performed over all symbols and all REs in the PRB pair in which the PBCH is transmitted, the E-PDCCH may not be transmitted. Otherwise, whether the E-PDCCH is transmitted may be determined according to the number of available REs. For example, like an existing PBCH structure, if transmission is performed over four symbols, the number of available REs is reduced to 96 or less even in the normal CP.

That is, if the PBCH structure of four symbols is assumed in the normal subframe in which the PBCH is transmitted, a maximum of two E-CCEs may be defined.

B. Special Subframe in NCT (1) Special Subframe in which the PBCH is not Transmitted If the PSS/SSS is designed to have the same structure as an existing subframe, that is, if the PSS/SSS is not designed to avoid collision with the DM-RS, the number of E-CCEs is determined using the method described in the first embodiment and, if the PSS/SSS is designed to avoid collision with the DM-RS, the number of E-CCEs is determined in consideration of the number of available REs.

(2) Special Subframe in which the PBCH is Transmitted

The number of available REs in the special subframe is always less than that of the normal subframe. Accordingly, in the special subframe in which the PBCH is transmitted, if the PBCH structure of four symbols is assumed, a maximum of two E-CCEs may be defined.

Figure 11:
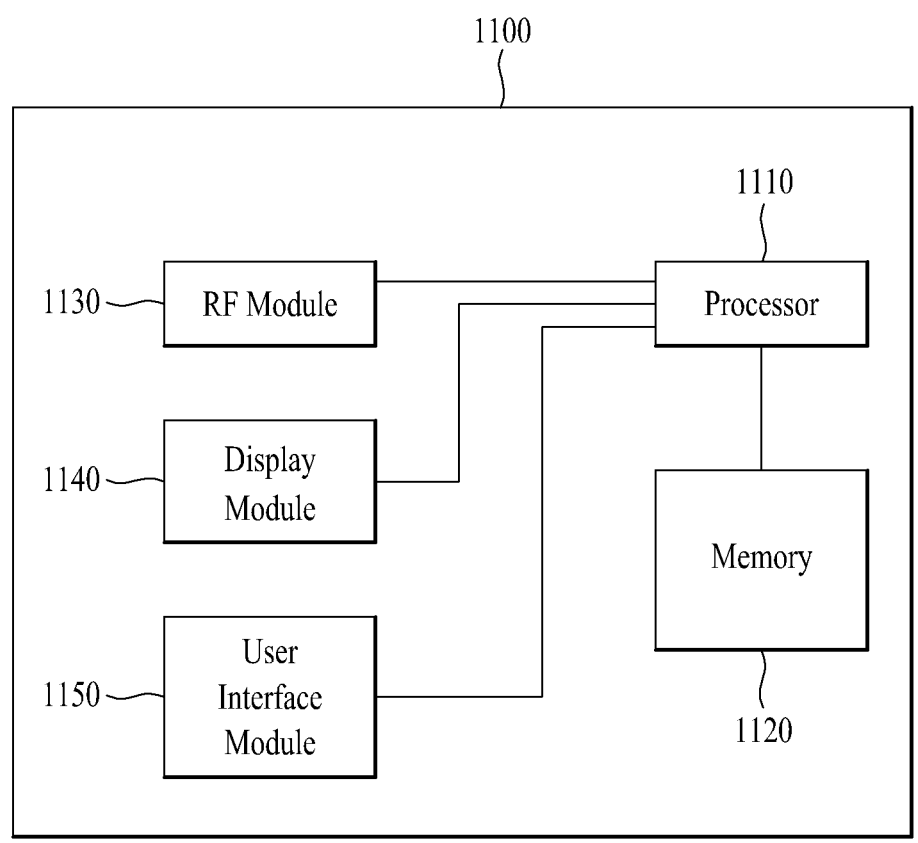
FIG. 11 is a block diagram of a communication apparatus according to one embodiment of the present invention.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 11.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method and apparatus for allocating resources for a downlink control channel in a wireless communication system is applied to a 3GPP LTE system is described, the present invention is applicable to various wireless communication systems in addition to the 3GPP LTE system.

The invention claimed is:

1. A method for transmitting a downlink control channel at a base station in a wireless communication system, the method comprising:
configuring a plurality of control channel elements of the downlink control channel in transmission resources;
mapping the control channel elements to one or more resource blocks of a subframe based on a special subframe configuration index of the subframe; and
transmitting the downlink control channel in the transmission resources,
wherein the type of the subframe is a special subframe of a Time Division Duplex (TDD) system with a normal cyclic prefix,
wherein, when the special subframe includes a primary synchronization signal or a secondary synchronization signal, each of the one or more resource blocks does not include the control channel elements,
wherein, when the special subframe does not include the primary synchronization signal or the secondary synchronization signal and the special subframe configuration index of the subframe is 3, 4 or 8, each of the one or more resource blocks consists of 4 control channel elements, and
wherein, when the special subframe does not include the primary synchronization signal or the secondary synchronization signal and the special subframe configuration index of the subframe is 1, 2, 6, 7 or 9, each of the one or more resource blocks consists of 2 control channel elements.

2. The method of claim 1, wherein the transmission resources are an aggregate of one or more control channel elements in the one or more resource blocks.

3. The method of claim 1, wherein the plurality of control channel elements are located in a data region of the subframe.

4. The method of claim 1,
wherein the plurality of control channel elements are enhanced control channel elements (ECCE), and
wherein the downlink control channel is Enhanced Physical Downlink Control Channel (EPDCCH).

5. The method of claim 1, wherein the special subframe comprises a Downlink Pilot Time Slot (DwPTS), a Guard Period (GP) and an Uplink Pilot Time Slot (UpPTS).

6. A base station in a wireless communication system, the base station comprising:
a transceiver; and
a processor operatively connected to the transceiver and configured to:
configure a plurality of control channel elements of the downlink control channel in transmission resources;
map the control channel elements to one or more resource blocks of a subframe based on a special subframe configuration index of the subframe; and
transmit the downlink control channel in the transmission resources,
wherein the type of the subframe is a special subframe of a Time Division Duplex (TDD) system with a normal cyclic prefix,
wherein, when the special subframe includes a primary synchronization signal or a secondary synchronization signal, each of the one or more resource blocks does not include the control channel elements,
wherein, when the special subframe does not include the primary synchronization signal or the secondary synchronization signal and the special subframe configuration index of the subframe is 3, 4 or 8, each of the one or more resource blocks consists of 4 control channel elements, and
wherein, when the special subframe does not include the primary synchronization signal or the secondary synchronization signal and the special subframe configuration index of the subframe is 1, 2, 6, 7 or 9, each of the one or more resource blocks consists of 2 control channel elements.

7. The base station of claim 6, wherein the transmission resources are an aggregate of one or more control channel elements in the one or more resource blocks.

8. The base station of claim 6,
wherein the plurality of control channel elements are enhanced control channel elements (ECCE), and
wherein the downlink control channel is Enhanced Physical Downlink Control Channel (EPDCCH).

9. The base station of claim 6, wherein the special subframe comprises a Downlink Pilot Time Slot (DwPTS), a Guard Period (GP) and an Uplink Pilot Time Slot (UpPTS).

* * * * *